United States Patent
Huh et al.

(10) Patent No.: US 7,499,826 B2
(45) Date of Patent: Mar. 3, 2009

(54) METHOD OF ESTIMATING MASS FOR VEHICLE SAFETY

(75) Inventors: Kun-Soo Huh, Seoul (KR); Jong-Chul Jung, Seoul (KR); Dae-Gun Hong, Seoul (KR); Sung-Hyun Lim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/856,567

(22) Filed: Sep. 17, 2007

(65) Prior Publication Data

US 2008/0126009 A1  May 29, 2008

(30) Foreign Application Priority Data

Nov. 29, 2006  (KR) .................. 10-2006-0118911

(51) Int. Cl.
  G06F 17/40 (2006.01)
  G06F 17/00 (2006.01)
(52) U.S. Cl. .............. 702/142; 702/141; 702/175; 701/38; 701/41
(58) Field of Classification Search .......... 702/142, 702/141, 175
  See application file for complete search history.

(56) References Cited

U.S. PATENT DOCUMENTS

| | | | |
|---|---|---|---|
| 6,144,928 A * | 11/2000 | Leimbach et al. | 702/173 |
| 6,167,357 A * | 12/2000 | Zhu et al. | 702/175 |
| 6,347,269 B1 | 2/2002 | Hayakawa et al. | |
| 6,633,006 B1 * | 10/2003 | Wolf et al. | 177/25.13 |
| 2003/0191572 A1 * | 10/2003 | Roll et al. | 701/70 |
| 2006/0069489 A1 * | 3/2006 | Chen et al. | 701/70 |

FOREIGN PATENT DOCUMENTS

| JP | 2002-116080 | 4/2002 |
|---|---|---|
| JP | 2004-184117 | 7/2004 |

* cited by examiner

*Primary Examiner*—Hal D Wachsman
(74) *Attorney, Agent, or Firm*—Morgan, Lewis & Bockius LLP

(57) ABSTRACT

A method of estimating a mass of a vehicle. If a yaw rate is smaller than a reference value, a straight direction model algorithm is applied to obtain an estimated mass. If a measured speed and a measured steering angle are larger than reference values, a lateral direction model algorithm is applied to obtain another estimated mass. If a measured vertical acceleration is larger than a reference value, a vertical direction model algorithm is applied to obtain yet another estimated mass. If each of the estimated masses is in an allowable range, and is constant for a given time period, the masses are applied to a recursive least square method, thereby estimating the mass of the vehicle.

5 Claims, 4 Drawing Sheets

METHOD OF ESTIMATING MASS FOR VEHICLE SAFETY

CROSS-REFERENCE TO RELATED APPLICATIONS

The present application is based on, and claims priority from, Korean Application Serial Number 10-2006-0118911, filed on Nov. 29, 2006, the disclosure of which is hereby incorporated by reference herein in its entirety.

FIELD OF THE INVENTION

The present invention relates to a method of estimating the mass of a vehicle, and more particularly, to a method of indirectly measuring the mass of a vehicle that determines traveling states of the vehicle, applies different algorithms depending on the traveling state, and estimates mass using the respective algorithms.

BACKGROUND OF THE INVENTION

Two methods of estimating the mass of a vehicle are known in the art: a method using a straight direction model algorithm, and a method using both a straight direction model algorithm and a lateral direction model algorithm.

The method using only a straight direction model algorithm includes a method of estimating the mass when there is information on a road surface gradient, and a method of estimating the mass when there is no information on the road surface gradient. When there is information on the road surface gradient, the method supplies information such as traction of the vehicle, inclination acceleration, inclination speed, the road surface gradient, and the like, while the vehicle travels straight, to a recursive least square (RLS) method. When there is no information on the road surface gradient, the method supplies information such as engine torque, brake torque, aero drag torque, engine speed, a rotational resistance constant, and the like, while the vehicle travels straight, to the RLS method. The method using the straight direction model algorithm is simple. However, the method has disadvantages in that the mass of the vehicle can only be estimated when the vehicle travels straight, and some of the variables used are difficult to measure.

The method using both a straight direction model algorithm and a lateral direction model algorithm uses a tire model and calculates the tire force in the straight and lateral directions. Compared to the method using only the straight direction model algorithm, the method using both the straight direction model algorithm and the lateral direction model algorithm can more flexibly estimate the mass of a moving vehicle. However, this method is more complicated, and is susceptible to errors of the tire force due to the tire model.

SUMMARY OF THE INVENTION

A method of estimating a mass of a vehicle. A first step measures a yaw rate of the vehicle, a speed of the vehicle, a steering angle of the vehicle, and a vertical acceleration of the vehicle. A second step compares the measured yaw rate to a reference yaw rate, and if the measured yaw rate is smaller than the reference yaw rate, applies a straight direction model algorithm, thereby estimating a second step mass. A third step compares the measured speed to a reference speed, and compares the measured steering angle to a reference steering angle, and if the measured speed is larger than the reference speed and the measured steering angle is larger than the reference steering angle, applies a lateral direction model algorithm, thereby estimating a third step mass. A fourth step compares the measured vertical acceleration with a reference vertical acceleration, and if the measured vertical acceleration is larger than the reference vertical acceleration, applies a vertical direction model algorithm, thereby estimating a fourth step mass. If the second step mass is constant for a fifth step amount of time, a fifth step determines whether the second step mass is in a range between a minimum mass and a maximum mass. If the third step mass is constant for a sixth step amount of time, a sixth step determines whether the third step mass is in the range between the minimum mass and the maximum mass. If the fourth step mass is constant for a seventh step amount of time, a seventh step determines whether the fourth step mass is in the range between the minimum mass and the maximum mass. If each of the second, third, and fourth step masses is in the range between the minimum and maximum masses, an eighth step applies the second, third, and fourth step masses to a recursive least square method, thereby estimating the mass of the vehicle.

The method may further return to the first step if the measured yaw rate is larger than the reference yaw rate, if the measured speed is smaller than the reference speed, if the measured steering angle is smaller than the reference steering angle, of if the measured vertical acceleration is smaller than the reference vertical acceleration.

The method may further return to the first step if the second step mass is not constant for the fifth step amount of time, if the third step mass is not constant for the sixth step amount of time, or if the fourth step mass is not constant for the seventh step amount of time.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Electronic Stability Control (ESC) in vehicles is currently in Europe, and soon will be required in other countries as well. ESC can allow frequent safety control, if an accurate vehicle mass is input to the ESC.

In addition, to prevent vehicle rollover, any safety system must be able to measure an accurate beginning time of the rollover. To obtain this time accurately, an accurate vehicle mass, as well as the height of the center of mass, must be input to the safety system.

However, known methods of estimating vehicle masses do not estimate them to the degree of accuracy needed. Therefore, a method that can estimate the vehicle mass accurately is desirable, so that this accurate mass can be input to vehicle control systems such as ESC or rollover prevention systems.

Figure 1:
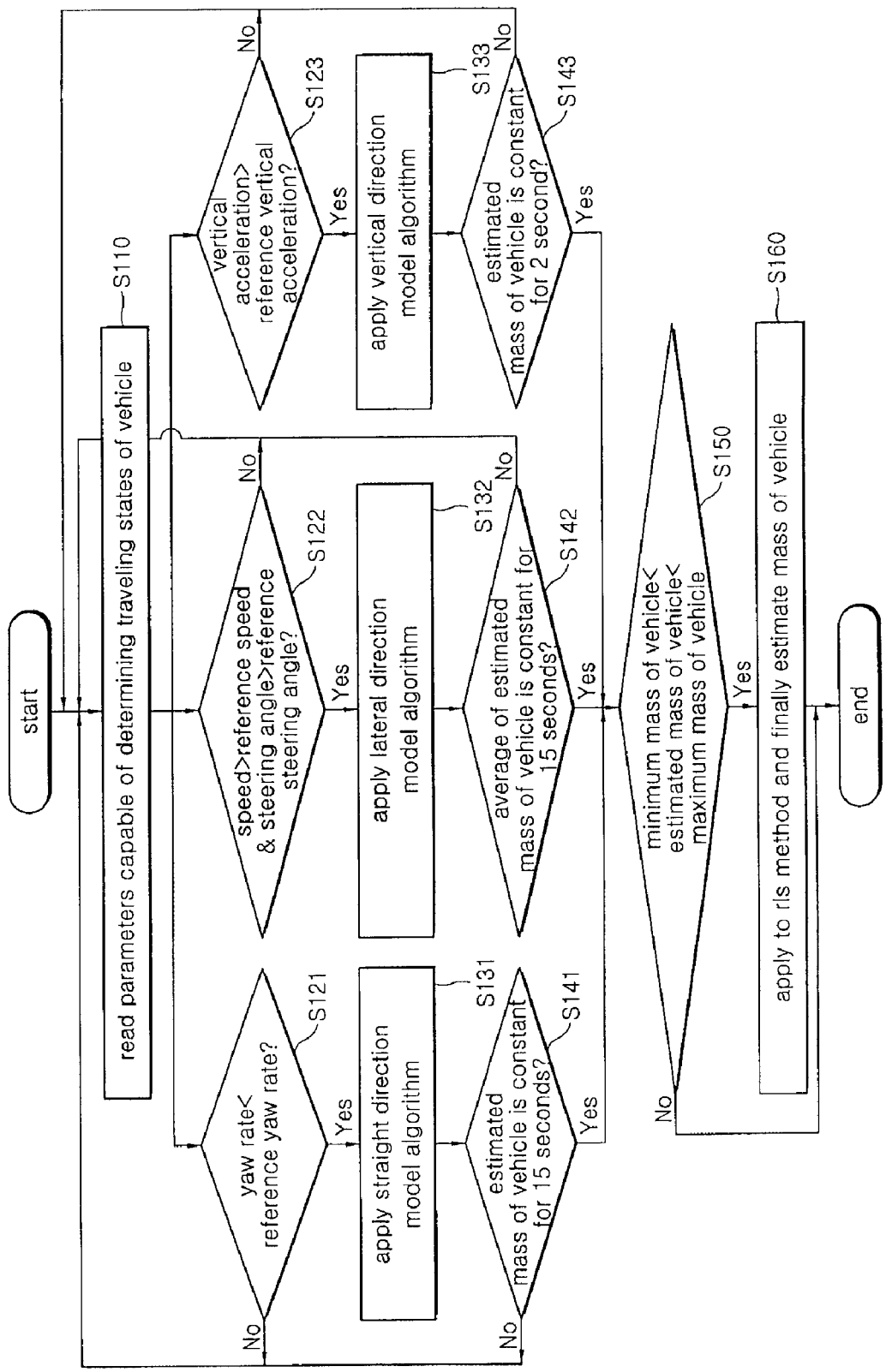
FIG. 1 is a flow chart illustrating a method of estimating the mass of a vehicle according to an embodiment of the present invention.

Referring to FIG. 1, according to a method of estimating the mass of a vehicle according to an embodiment of the present invention, first, parameters are measured by which a traveling state of the vehicle can be determined (Step S110). The parameters may include yaw rate, vehicle speed, steering angle, and vertical acceleration of the vehicle. The parameters measured at Step S110 are compared with reference values to determine whether the traveling state of the vehicle is straight, lateral, or vertical (Steps S121, S122, and S123).

More specifically, the method includes determining whether the yaw rate measured at Step S110 is smaller than a reference yaw rate (Step S121). If the measured yaw rate is larger than the reference yaw rate, the method returns to Step S110. If the measured yaw rate is smaller than the reference yaw rate, the mass of the vehicle is estimated by applying a straight direction model algorithm (Step S131).

The straight direction model algorithm may be as follows:

$$y(t) = \Phi^T \theta(t) + \eta(t), \text{ where:} \quad (1)$$

$$y(t) = F_e(t); \quad (2)$$

$$\Phi^T = \lfloor a_x(t) v_x^2(t) g \rfloor; \text{ and} \quad (3)$$

$$\theta(t) = \begin{bmatrix} m \\ C_{df} \\ \mu_r m \cos\beta(t) + m \sin\beta(t) \end{bmatrix}; \text{ and where} \quad (4)$$

θ(t) is a parameter vector;
η(t) indicates disturbances;
$F_e$ indicates engine output;
$a_x$ indicates straight acceleration;
$v_x$ indicates straight speed;
m indicates the mass of the vehicle;
$C_{df}$ indicates the total air resistance coefficient;
$\mu_r$ indicates a rolling coefficient;
β indicates a road surface gradient; and
g indicates acceleration due to gravity.

Further, the result of the above method is applied to an RLS method, which includes a disturbance estimator, for robust estimation performance:

$$\hat{\theta}(t) = \hat{\theta}(t-1) + P(t)\Phi(t)(y(t) - \Phi^T(t)\hat{\theta}(t-1) - \hat{\eta}(t)); \text{ where} \quad (5)$$

$$P(t) = P(t-1) - P(t-1)\Phi(t)(I + \Phi^T(t)P(t-1)\Phi(t))^{-1}\Phi^T(t)P(t-1); \text{ and} \quad (6)$$

$$\hat{\eta}(t) = Q(z)(y(t) - \Phi^T)(t)\hat{\theta}(t-1)); \text{ and where} \quad (7)$$

$\hat{\theta}(t)$ indicates an estimated parameter vector,
P(t) indicates a covariance matrix;
$\hat{\eta}(t)$ indicates an estimated disturbance, and
Q(z) indicates a selected low pass filter.

Further, the method includes determining whether the speed of the vehicle that is measured at Step S110 is larger than a reference speed, and the steering angle of the vehicle is larger than a reference steering angle (Step S122). If the measured speed is smaller than the reference speed or the measured steering angle is smaller than the reference steering angle, the method returns to Step S110. If the measured speed is larger than the reference speed, and the measured steering angle is larger than the reference steering angle, the method applies the lateral direction model algorithm so as to estimate the mass of the vehicle (Step S132).

Figure 4:
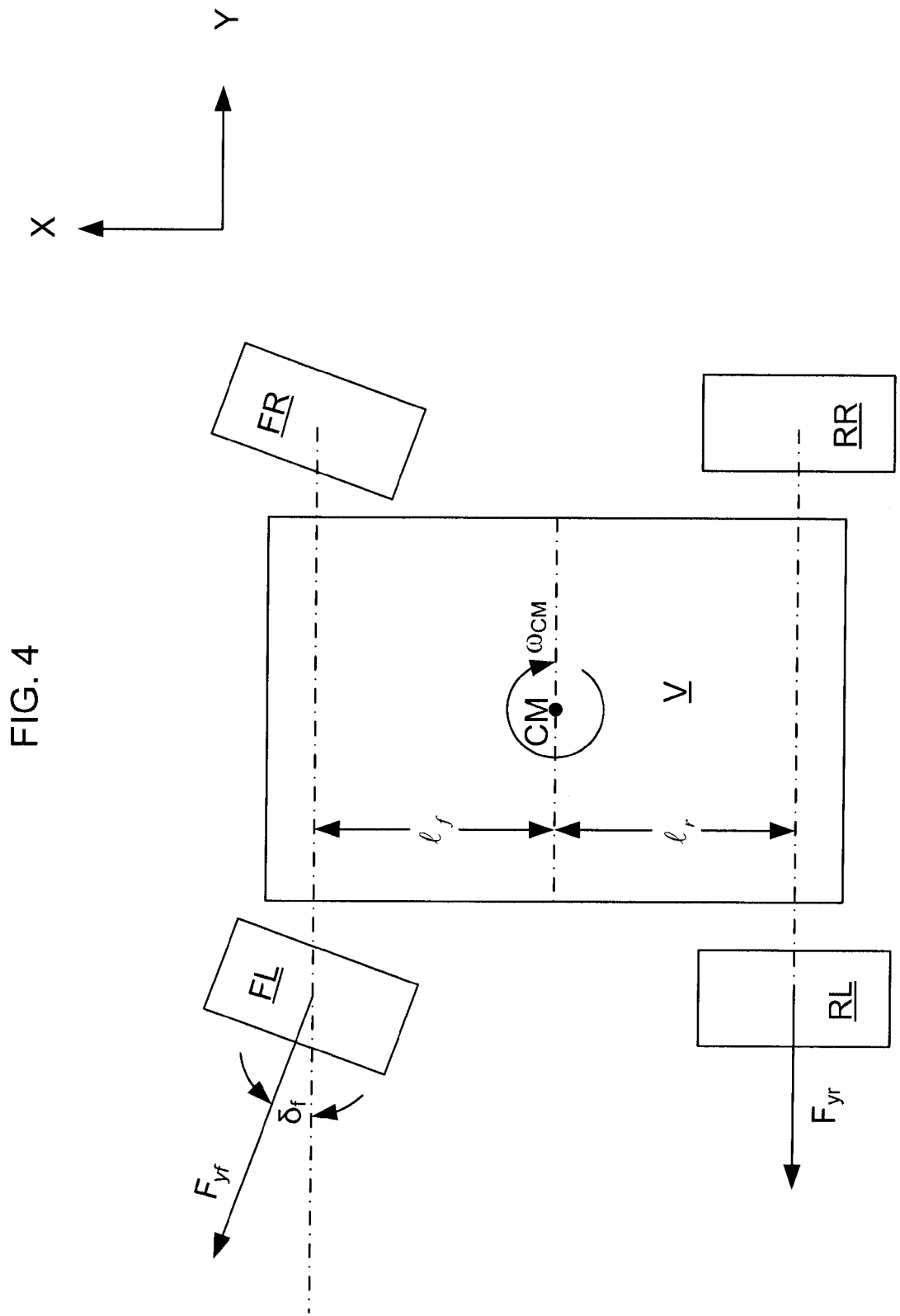
FIG. 4 is a schematic diagram illustrating several of the variables used in the lateral direction model algorithm according to an embodiment of the present invention.

Referring to FIG. 4, which schematically illustrates a vehicle V having a center of mass CM and front left FL, front right FR, rear left RL, and rear right RR wheels, the lateral direction model may be as follows:

$$ma_y = F_{yf}\cos\delta_f + F_{yr} \quad (8)$$

$$F_{yf} = C_{af}\alpha_f = C_{af}\left(\frac{v_y + \ell_f \cdot \omega_{cm}}{v_x} - \delta_f\right) \quad (9)$$

$$F_{yr} = C_{ar}\alpha_r = C_{ar}\left(\frac{v_y - \ell_r \cdot \omega_{cm}}{v_x}\right) \quad (10)$$

$$v_x = \frac{(\omega_{RL} + \omega_{RR})r_t}{2}; \text{ where} \quad (11)$$

$a_y$ indicates lateral acceleration of the vehicle V;
$F_{yf}$ indicates lateral force of the front wheels FL and FR;
$F_{yr}$ indicates lateral force of the rear wheels RL and RR;
$\delta_f$ indicates the steering angle;
$C_{af}$ indicates a front wheel cornering rigidity modulus;
$C_{ar}$ indicates a rear wheel cornering rigidity modulus
$\alpha_f$ indicates a front wheel slip angle;
$\alpha_r$ indicates a rear wheel slip angle;
$v_x$ indicates straight speed of the vehicle V;
$v_y$ indicates lateral speed of the vehicle V
$l_f$ indicates a distance from the center of the front wheels FL and FR to the center of mass CM of the vehicle V;
$l_r$ indicates a distance from the center of the rear wheels RL and RR to the center of mass CM of the vehicle V;
$\omega_{um}$ indicates angular velocity of the center of mass CM of the vehicle V;
$\omega_{RL}$ indicates angular velocity of the left rear wheel RL;
$\omega_{RR}$ indicates angular velocity of the right rear wheel RR; and
$r_t$ indicates a radius of the tires.

The straight speed $v_x$ of the vehicle and the lateral speed $v_y$ of the vehicle are applied to a Kalman filter so as to perform the estimation.

$$\frac{d}{dt}\begin{bmatrix}v_x\\v_y\end{bmatrix} = \begin{bmatrix}0 & \omega_{cm}\\-\omega_{cm} & 0\end{bmatrix}\begin{bmatrix}v_x\\v_y\end{bmatrix} + \begin{bmatrix}1 & 0\\0 & 1\end{bmatrix}\begin{bmatrix}a_x\\a_y\end{bmatrix} \quad (12)$$

$$y = \begin{bmatrix}1 & 0\end{bmatrix}\begin{bmatrix}v_x\\v_y\end{bmatrix} \quad (13)$$

$\delta_f$, $\omega_{cm}$, $a_x$, and $a_y$ are measured quantities. $v_x$ and $v_y$ are calculated by equations 11-13. $F_{yf}$ and $F_{yr}$ are then calculated from equations 9-10, and subsequently, the lateral direction model algorithm mass is estimated from equation 8:

$$ma_y = F_{yf}\cos\delta_f + F_{yr} \Rightarrow \quad (8)$$

$$m = \frac{F_{yf}\cos\delta_f + F_{yr}}{a_y} \quad (14)$$

The method further determines whether the vertical acceleration of the vehicle that is measured in S110 is larger than a reference vertical acceleration (Step S123). If the measured vertical acceleration is smaller than the reference vertical acceleration, the method returns to Step S110. If the measured vertical acceleration is larger than the reference vertical acceleration, the method uses the vertical direction model algorithm to estimate the mass of the vehicle (Step S133).

The vertical direction model algorithm uses a recursive least square (RLS) method for displacement estimation and an RLS method for mass estimation.

The recursive least square (RLS) method for displacement estimation may be as follows:

$$y(t)=\Phi\theta(t); \text{ where:} \quad (15)$$

$$y(t)=m_u(\ddot{z}_{u_{fl}}(t)+\ddot{z}_{u_{fr}}(t)+\ddot{z}_{u_{rl}}(t)+\ddot{z}_{u_{rr}}(t))+m_s^n \ddot{z}_{cm}(t) \quad (16)$$

$$\Phi=[-K_u] \quad (17)$$

$$\theta(t)=[(\Sigma z_u(t)-\Sigma z_s(t))]; \text{ and where} \quad (18)$$

$m_u$ indicates the unsprung mass;
$m_s^n$ indicates the nominal sprung mass;
$z_{u_{fl}}(t)$, $z_{u_{fr}}(t)$, $z_{u_{rl}}(t)$, and $z_{u_{rr}}(t)$ indicate displacements of the unsprung mass of respective ones of the wheels;
$K_u$ indicates a tire rigidity modulus;
$\Sigma z_u(t)$ indicates $z_{u_{fl}}(t)+z_{u_{fr}}(t)+z_{u_{rl}}(t)+z_{u_{rr}}(t)$;
$\Sigma z_s(t)$ indicates $z_{s_{fl}}(t)+z_{s_{fr}}(t)+z_{s_{rl}}(t)+z_{s_{rr}}(t)$;
and $z_{s_{fl}}(t)$, $z_{s_{fr}}(t)$, $z_{s_{rl}}(t)$ and $z_{s_{rr}}(t)$ indicate displacements of the sprung mass of respective ones of the wheels.

The RLS method for mass estimation may be as follows:

$$y(t)=\Phi(t)\theta; \text{ where} \quad (19)$$

$$y(t)=m_u(\ddot{z}_{u_{fl}}(t)+\ddot{z}_{u_{fr}}(t)+\ddot{z}_{u_{rl}})+(t)+\ddot{z}_{u_{rr}}(t))+K_u(\Sigma z_u-\Sigma z_s) \quad (20)$$

$$\Phi(t)=[-\ddot{z}(t)] \quad (21)$$

$$\theta=[m_s] \quad (22)$$

According to the vertical direction model algorithm, the mass of the vehicle is estimated as follows.

$$\hat{m}=m_u+\hat{m}_s \quad (23)$$

Then, the method determines whether the mass of the vehicle that is estimated at Step S131 is constant for fifteen seconds (Step S141). If the mass of the vehicle that is estimated at Step S131 is constant for fifteen seconds, the method determines whether the mass estimated at Step S131 is in a range between the minimum mass of the vehicle and the maximum mass of the vehicle (Step S150). If the mass of the vehicle estimated in S131 is not constant for fifteen seconds, the method returns to Step S110.

Further, the method determines whether an average of the mass of the vehicle estimated at Step S132 is constant for fifteen seconds (Step S142). If the mass of the vehicle estimated in S132 is constant for fifteen seconds, the method determines whether the mass estimated at Step S132 is in a range between the minimum mass of the vehicle and the maximum mass of the vehicle (Step S150). If the average of the mass of the vehicle estimated in S132 is not constant for fifteen seconds, the method returns to Step S110.

Further, the method determines whether the mass of the vehicle that is estimated at Step S133 is constant for two seconds (Step S143). If the mass of the vehicle that is estimated at Step S133 is constant for two seconds, the method determines whether the mass of the vehicle estimated at Step S133 is in a range between the minimum mass of the vehicle and the maximum mass of the vehicle (Step S150). If the mass of the vehicle estimated in S133 is not constant for two seconds, the method returns to Step S110.

Then, the method finally estimates the mass of the vehicle by applying the mass of the vehicle that is estimated at each of Steps S131, S132, and S133 to the RLS method if the mass of the vehicle that is estimated at each of Steps S131, S132, and S133 satisfies the range at Step S150 (Step S160). If the mass of the vehicle that is estimated at each of Steps S131, S132, and S133 does not satisfy the range at Step S150, the method ends.

Once the mass has been estimated, the inventive method may input the mass to a control unit, such as an ESC control unit or other safety system control unit, so that it can be used in stability control, rollover control, or other vehicle controls.

The inventive method uses variables that can be measured while the vehicle is moving, and can estimate the mass in various traveling states of the vehicle, improving robustness in estimation.

Figure 2A:
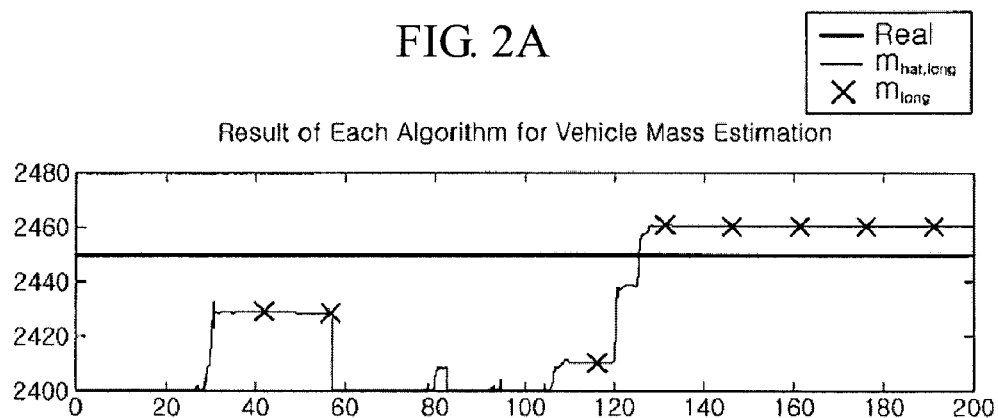
FIG. 2A is a graph illustrating the estimation result of the mass of a vehicle by applying a straight direction model algorithm according to an embodiment of the present invention.
Figure 2B:
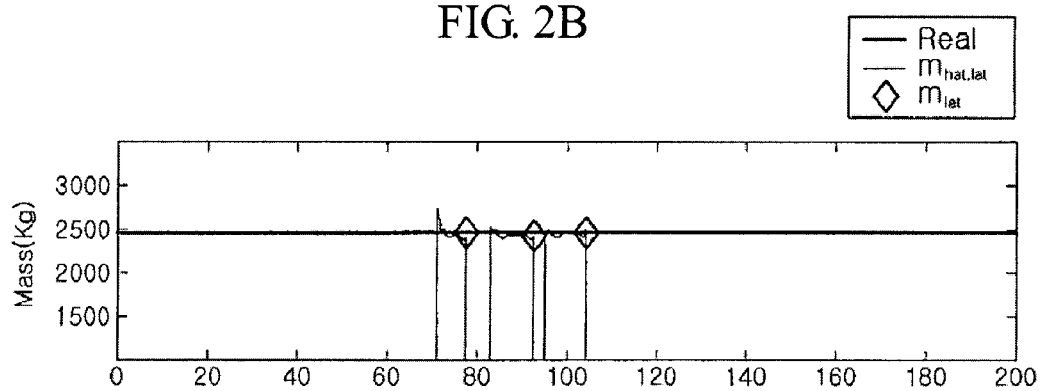
FIG. 2B is a graph illustrating the estimation result of the mass of a vehicle by applying a lateral direction model algorithm according to an embodiment of the present invention.
Figure 2C:
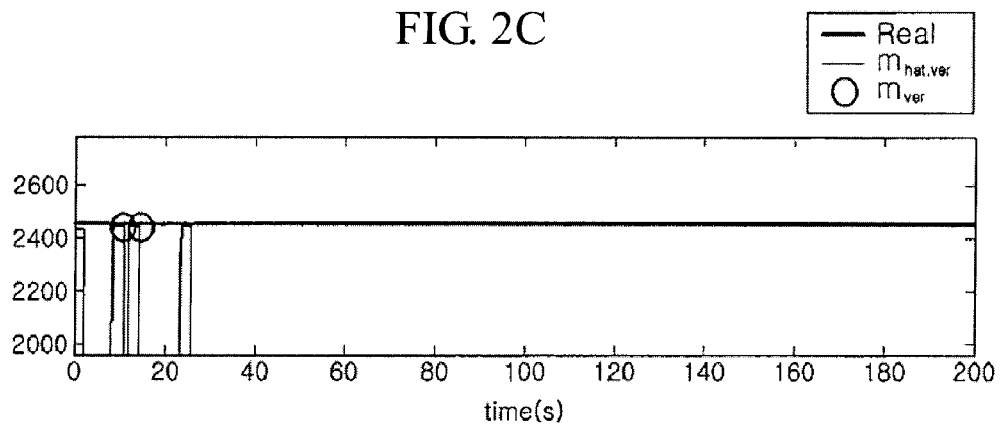
FIG. 2C is a graph illustrating the estimation result of the mass of a vehicle by applying a vertical direction model algorithm according to an embodiment of the present invention.

Referring to FIG. 2A, the mass $m_{hat,long}$ of the vehicle that is estimated by applying the exemplary straight direction model algorithm shows a constant value for fifteen seconds at a value similar to the actual mass $R_{real}$ of the vehicle. Referring to FIG. 2B, the mass $m_{hat,lat}$ of the vehicle that is estimated by applying the exemplary lateral direction model algorithm shows a constant value for fifteen seconds at a value similar to actual mass $R_{real}$ of the vehicle. Referring to FIG. 2C, the mass $m_{hat,ver}$ of the vehicle that is estimated by applying the exemplary vertical direction model algorithm shows a constant value for two seconds at a similar value to actual mass $R_{real}$ of the vehicle.

Figure 3:
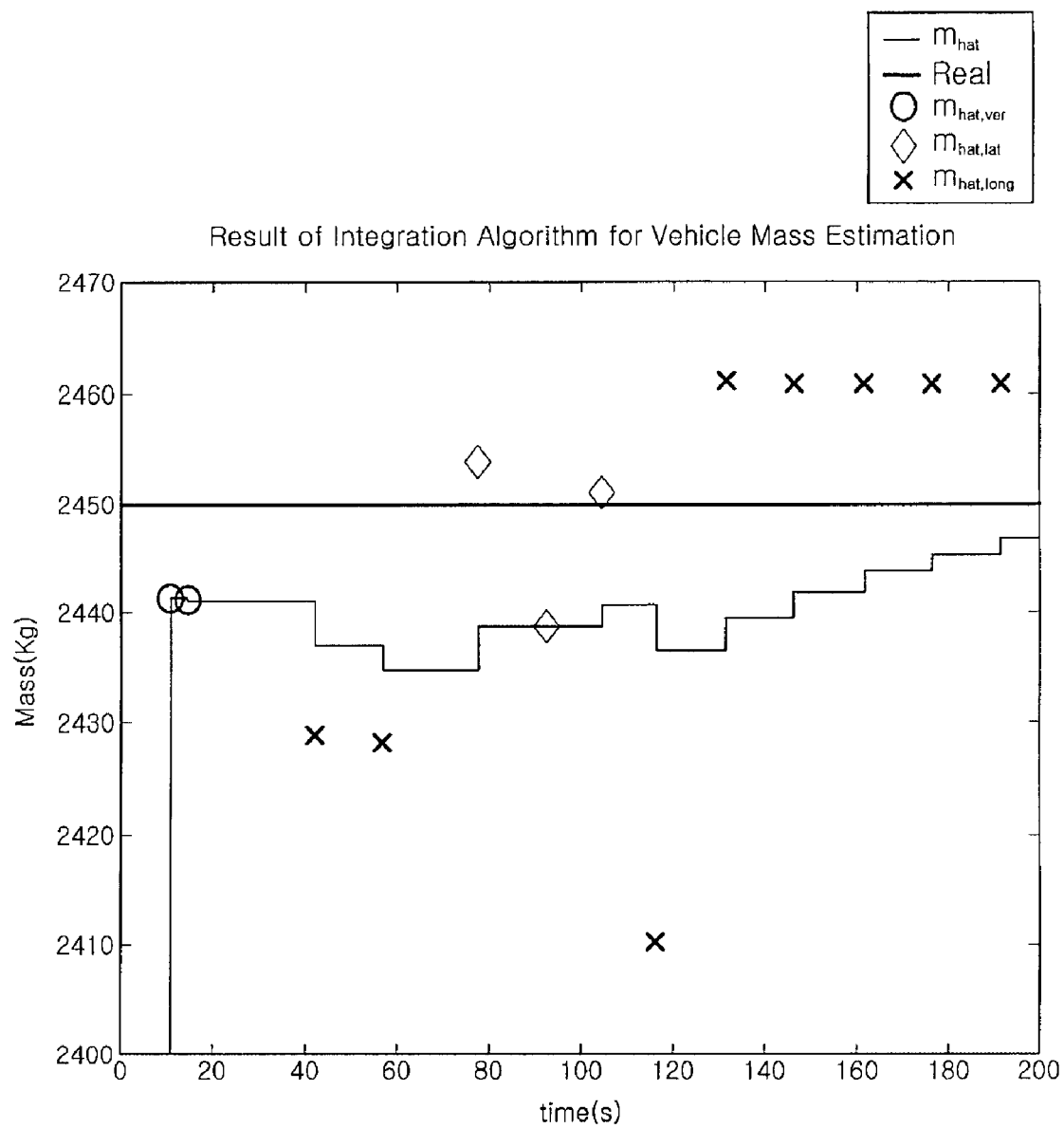
FIG. 3 is a graph illustrating the final estimated mass of a vehicle that is estimated by using a recursive least square (RLS) method.

Referring to FIG. 3, the final estimated mass $m_{hat}$ of the vehicle that is estimated by using the inventive method shows a similar value to actual mass $R_{real}$ of the vehicle.

As apparent from the forgoing, there is an advantage in that the method of estimating the mass of a vehicle according to embodiments of the present invention uses variables that can be measured while the vehicle is traveling, and can estimate the mass of the vehicle in various traveling states of the vehicle, such that robustness in the estimation is improved.

What is claimed is:

1. A method of estimating a mass of a vehicle, comprising:
   a first step of measuring a yaw rate of the vehicle, a speed of the vehicle, a steering angle of the vehicle, and a vertical acceleration of the vehicle;
   a second step of comparing the measured yaw rate to a reference yaw rate, and if the measured yaw rate is smaller than the reference yaw rate, applying a straight direction model algorithm, thereby estimating a second step estimated mass of the vehicle;
   a third step of comparing the measured speed to a reference speed, and comparing the measured steering angle to a reference steering angle, and if the measured speed is larger than the reference speed and the measured steering angle is larger than the reference steering angle, applying a lateral direction model algorithm, thereby estimating a third step estimated mass of the vehicle;
   a fourth step of comparing the measured vertical acceleration with a reference vertical acceleration, and if the measured vertical acceleration is larger than the reference vertical acceleration, applying a vertical direction model algorithm, thereby estimating a fourth step estimated mass of the vehicle;
   a fifth step of, if the second step estimated mass is constant for a fifth step amount of time, determining whether the second step estimated mass is in a range between a minimum mass and a maximum mass;

a sixth step of, if the third step estimated mass is constant for a sixth step amount of time, determining whether the third step estimated mass is in the range between the minimum mass and the maximum mass;

a seventh step of, if the fourth step estimated mass is constant for a seventh step amount of time, determining whether the fourth step estimated mass is in the range between the minimum mass and the maximum mass;

an eighth step of, if each of the second, third, and fourth step estimated masses is in the range between the minimum and maximum masses, applying the second, third, and fourth step estimated masses to a recursive least square method, thereby estimating the mass of the vehicle; and a ninth step of inputting the mass of the vehicle to a control unit.

2. The method as defined in claim 1, further comprising returning to the first step if the measured yaw rate is larger than the reference yaw rate, if the measured speed is smaller than the reference speed, if the measured steering angle is smaller than the reference steering angle, of if the measured vertical acceleration is smaller than the reference vertical acceleration.

3. The method as defined in claim 1, further comprising returning to the first step if the second step mass is not constant for the fifth step amount of time, if the third step estimated mass is not constant for the sixth step amount of time, or if the fourth step estimated mass is not constant for the seventh step amount of time.

4. The method as defined in claim 1, wherein the control unit comprises an electronic stability control unit, which performs safety control based on the mass of the vehicle.

5. The method as defined in claim 1, wherein the control unit determines whether a vehicle rollover risk exists based on the mass of the vehicle, and performs safety control based on whether the vehicle rollover risk exists.

* * * * *